United States Patent
Gustafsson et al.

(10) Patent No.: US 8,389,427 B2
(45) Date of Patent: Mar. 5, 2013

(54) HYDROENTANGLED NONWOVEN MATERIAL

(75) Inventors: Anders Gustafsson, Billdal (SE); Lars Fingal, Gothenburg (SE); Mikael Strandqvist, Lindome (SE); Kaveh Tondkar, Gothenburg (SE)

(73) Assignee: SCA Hygiene Products AB, Gothenburg (SE)

( * ) Notice: Subject to any disclaimer, the term of this patent is extended or adjusted under 35 U.S.C. 154(b) by 602 days.

(21) Appl. No.: 12/447,397

(22) PCT Filed: Nov. 29, 2006

(86) PCT No.: PCT/SE2006/001353
§ 371 (c)(1),
(2), (4) Date: Apr. 27, 2009

(87) PCT Pub. No.: WO2008/066417
PCT Pub. Date: Jun. 5, 2008

(65) Prior Publication Data
US 2010/0075120 A1    Mar. 25, 2010

(51) Int. Cl.
*D04H 1/46* (2012.01)
*D04H 1/54* (2012.01)
*D04H 1/62* (2006.01)

(52) U.S. Cl. ........ 442/408; 442/402; 442/403; 442/405; 442/409

(58) Field of Classification Search ............. 442/384, 442/385, 402, 403, 405, 407, 408, 413
See application file for complete search history.

(56) References Cited

U.S. PATENT DOCUMENTS

| 4,041,203 | A | | 8/1977 | Brock | |
|---|---|---|---|---|---|
| 4,808,467 | A | * | 2/1989 | Suskind et al. | 442/384 |
| 5,587,225 | A | * | 12/1996 | Griesbach et al. | 428/198 |
| 2003/0114071 | A1 | * | 6/2003 | Everhart et al. | 442/414 |
| 2005/0112980 | A1 | * | 5/2005 | Strandqvist et al. | 442/416 |
| 2005/0136777 | A1 | * | 6/2005 | Thomaschefsky et al. | 442/408 |

FOREIGN PATENT DOCUMENTS

| EP | 0534863 | 3/1993 |
|---|---|---|
| WO | 9503171 | 2/1995 |
| WO | 03048440 | 6/2003 |
| WO | 2005042819 | 5/2005 |

OTHER PUBLICATIONS

International Search Report dated May 28, 2007 in PCT application.

* cited by examiner

*Primary Examiner* — Jennifer A Steele
(74) *Attorney, Agent, or Firm* — Young & Thompson

(57) ABSTRACT

A hydroentangled nonwoven material (8), includes a mixture of randomized continuous filaments (3) and natural fibers (5), wherein at least part of the staple fibers and/or the continuous filaments includes thermoplastic material. The nonwoven material is bonded in a non-random bonding pattern including a plurality of bonding sites (14) in which thermoplastic material included in the nonwoven material has been caused to at least partly soften or melt to create thermal bonds between the continuous filaments. The nonwoven material includes no other thermal bonds between the filaments than provided by the non-random bonding pattern. The nonwoven material may also contain synthetic staple fibers (6).

12 Claims, 3 Drawing Sheets

HYDROENTANGLED NONWOVEN MATERIAL

TECHNICAL AREA

The present invention refers to a hydroentangled composite nonwoven material, comprising a mixture of continuous filaments, synthetic staple fibres, and natural fibres.

BACKGROUND OF THE INVENTION

Absorbent nonwoven materials are often used for wiping spills and leakages of all kinds in industrial, service, office and home locations. The basic synthetic plastic components normally are hydrophobic and will absorb oil, fat and grease, and also to some degree water by capillary force. To reach a higher water absorption level, cellulosic pulp is often added. A variety of demands are put on nonwoven materials made for wiping purposes. An ideal wiper should be strong, absorbent, abrasion resistant and exhibit low linting. In order to replace textile wipers, which is still a major part of the market, the nonwoven wipers should further be soft and have a textile touch.

Nonwoven materials comprising mixtures of cellulosic pulp and synthetic fibres can be produced by conventional papermaking processes, see e.g. U.S. Pat. No. 4,822,452, which describes a fibrous web formed by wetlaying, the web comprising staple length natural or synthetic fibres and cellulose paper-making fibres. An associative thickener is further added to the furnish.

Hydroentangling or spunlacing is a technique introduced during the 1970'ies, see e.g. CA patent no. 841 938. The method involves forming a fibre web which is either drylaid or wetlaid, after which the fibres are entangled by means of very fine water jets under high pressure. Several rows of water jets are directed against the fibre web which is supported by a movable fabric. The entangled fibre web is then dried. The fibres that are used in the material can be synthetic or regenerated staple fibres, e.g. polyester, polyamide, polypropylene, rayon or the like, pulp fibres or mixtures of pulp fibres and staple fibres. Spunlace materials can be produced in high quality to a reasonable cost and have a high absorption capacity. They can e.g. be used as wiping material for household or industrial use, as disposable materials in medical care and hygiene articles etc.

In WO 96/02701 there is disclosed hydroentangling of a foamformed fibrous web. Foamforming is a special variant of wetlaying where the water besides fibres and chemicals also contains a surfactant which makes it possible to create foam where the fibres can be enmeshed in and between the foam bubbles. The fibres included in the fibrous web can be pulp fibres and other natural fibres and synthetic fibres.

Through e.g. EP-B-0 333 211 and EP-B-0 333 228 it is known to hydroentangle a fibre mixture in which one of the fibre components is meltblown fibres. A web of meltblown fibres is combined with another fibrous web and the combined webs are hydroentangled, or alternatively a "coform material" comprising an essentially homogeneous mixture of meltblown fibres and other fibres is airlaid on a forming fabric and subsequently hydroentangled.

Through EP-A-0 308 320 it is known to bring together a prebonded web of continuous filaments with a separately prebonded wetlaid fibrous material containing pulp fibres and staple fibres and hydroentangle together the separately formed fibrous webs to a laminate. In such a material the fibres of the different fibrous webs will not be integrated with each other since the fibres already prior to the hydroentangling are bonded to each other and only have a very limited mobility. The material will show a marked two-sidedness. The staple fibres used have a preferred length of 12 to 19 mm, but could be in the range from 9.5 mm to 51 mm.

EP-A-0 492 554 describes a nonwoven material made from continuous filaments and pulp fibers. Pulp fibers are wet laid on top of a bonded spunlaid web and the two layers are combined by hydroentanglement. As in the above case it is difficult to integrate a prebonded web of filaments with other fibers and the hydroentanglement energy required to combine the pulp fibers with the bonded spunlaid web is rather high.

WO 2005/042819 discloses a hydroentangled, well integrated composite nonwoven material, comprising a mixture of continuous filaments, synthetic staple fibres, and natural fibres, said material having a reduced two-sidedness. The synthetic staple fibres are short, having a length between 3 and 7 mm. The choice of such short staple fibres enables pulp fibres and staple fibres to be better mixed and distributed thoroughly throughout the nonwoven material. There are no thermal bonds between the filaments to ascertain that the fibres and filaments are fully mixed with each other.

WO 02/38846 discloses a hydroentangled nonwoven composite structure containing recycled synthetic fibrous material and continuous filaments. The recycled synthetic fibrous material comprises short thread elements, which are fractions of fibrous material separated from a bonded material suspended in a liquid. The continuous filaments are supplied in the form of a web, which is handled in roll form and therefore has to be bonded at least to some extent. The hydroentangled material is dried utilizing a non-compressive drying process such as through-air drying.

One problem occurring in many webs containing long filaments is that after use as a wiper for some time, segments of the filaments may come loose and rise as loops above the surface of the web material. This phenomenon is referred to as "pilling". This may especially be a problem in web materials comprising a mixture of filaments and short fibers (shorter than about 8 mm) since these short fibers have a very limited ability to twist around and entangle with the filaments. The problem with pilling may be reduced by increasing the hydroentanglement energy, which however is disadvantageous in other aspects.

OBJECT AND MOST IMPORTANT FEATURES OF THE INVENTION

It is an object of the present invention to provide an improved hydroentangled well integrated composite nonwoven material, comprising a mixture of continuous filaments and natural fibres and which is abrasion resistant and less sensitive to pilling and which may be produced with an energy effective process.

This has according to the invention been obtained by a hydroentangled composite nonwoven material, comprising a mixture of randomized continuous filaments and natural fibres, in which the nonwoven material is bonded in a non-random bonding pattern comprising a plurality of bonding sites, in which thermoplastic material comprised in the nonwoven material has been caused to at least partly soften or melt to create thermal bonds between the continuous filaments and wherein the nonwoven material comprises no other thermal bonds between the filaments than provided by said non-random bonding pattern.

In one aspect of the invention the bonding pattern comprises a plurality of bonding sites, each having a bonding area of 0.1 to 3 mm$^2$, preferably from 0.15 to 2 mm$^2$.

In a further aspect of the invention the bonding pattern has a bonding density of between 1 and 100 bonding sites per cm$^2$, preferably between 2 and 90 bonding sites per cm$^2$ and more preferably between 5 and 80 bonding sites per cm$^2$.

In a still further aspect of the invention the bonding sites cover an area of between 1 and 25%, preferably between 2 and 20% and more preferably between 5 and 18% of the thermally bonded nonwoven material.

According to one embodiment the nonwoven material further comprises synthetic staple fibres. Said synthetic staple fibers preferably have a length of 3 to 7 mm, and more preferably 4 to 6 mm.

According to a further embodiment no more than 10% of the synthetic staple fibers contained in the nonwoven material has a length greater than greater than 7 mm and preferably it is free from staple fibers having a length greater than 7 mm.

According to one embodiment the material according to the invention comprises a mixture of 10-50% continuous filaments, 5-50% synthetic staple fibres, and 20-85% natural fibres, all percentages calculated by weight of the total nonwoven material. A more preferred material has 15-35% continuous filaments. More preferred is also 5-25% synthetic staple fibres. Also more preferred is 40-75% natural fibres.

In a further embodiment the continuous filaments are spunlaid filaments.

The continuous filaments may be chosen from the group: polypropylene, polyesters and polylactides.

According to a further embodiment the synthetic staple fibres are chosen from the group: polyethylene, polypropylene, polyesters, polyamides, polylactides, rayon, and lyocell.

In one aspect of the invention at least a part of the synthetic staple fibres are bicomponent fibers having a low melting component and a high melting component, wherein said thermobonding is accomplished by melting of the low melting component of the bicomponent fibres to create said bonding sites between the continuous filaments.

A preferred material according to the invention is where the natural fibres consist of pulp fibres, more preferably wood pulp fibres.

A further object of the invention is to provide a method of producing an improved hydroentangled well integrated composite nonwoven material, comprising a mixture of continuous filaments and natural fibres which is abrasion resistant and less sensitive to pilling and which may be produced with an energy effective process.

This has according to the invention been obtained by providing a method comprising forming a web of continuous filaments on a forming fabric, wherein said web of continuous filaments is unbonded with no thermal bondings between the filaments, and applying a wet-formed fibre dispersion containing natural fibres on top of said unbonded web of continuous filaments, thus forming a fibrous web containing said continuous filaments and natural fibres, hydroentangling the fibrous web to form a nonwoven material, and subsequently thermobonding the hydroentangled nonwoven material in a non-random bonding pattern comprising a plurality of bonding sites in which thermoplastic material comprised in the nonwoven material is caused to at least partly soften or melt to create thermal bonding sites between the continuous filaments.

In one aspect of the invention the thermobonding is accomplished by a process chosen from: heat bonding, ultrasonic bonding, laser bonding.

In one embodiment the wet-formed fibre dispersion also contains synthetic staple fibers. The synthetic staple fibers preferably have a length of 3 to 7 mm, preferably 4 to 6 mm.

In a further aspect of the invention at least part of the staple fibers comprised in the fibrous web that is hydroentangled, are bicomponent fibers having a low melting component and a high melting component, wherein said thermobonding is accomplished by melting of the low melting component of the bicomponent fibres to create said bonding sites between the continuous filaments.

DESCRIPTION OF THE DRAWINGS

The invention will be closer described below with reference to some embodiments shown in the accompanying drawings.

DETAILED DESCRIPTION OF THE INVENTION

Figure 1:
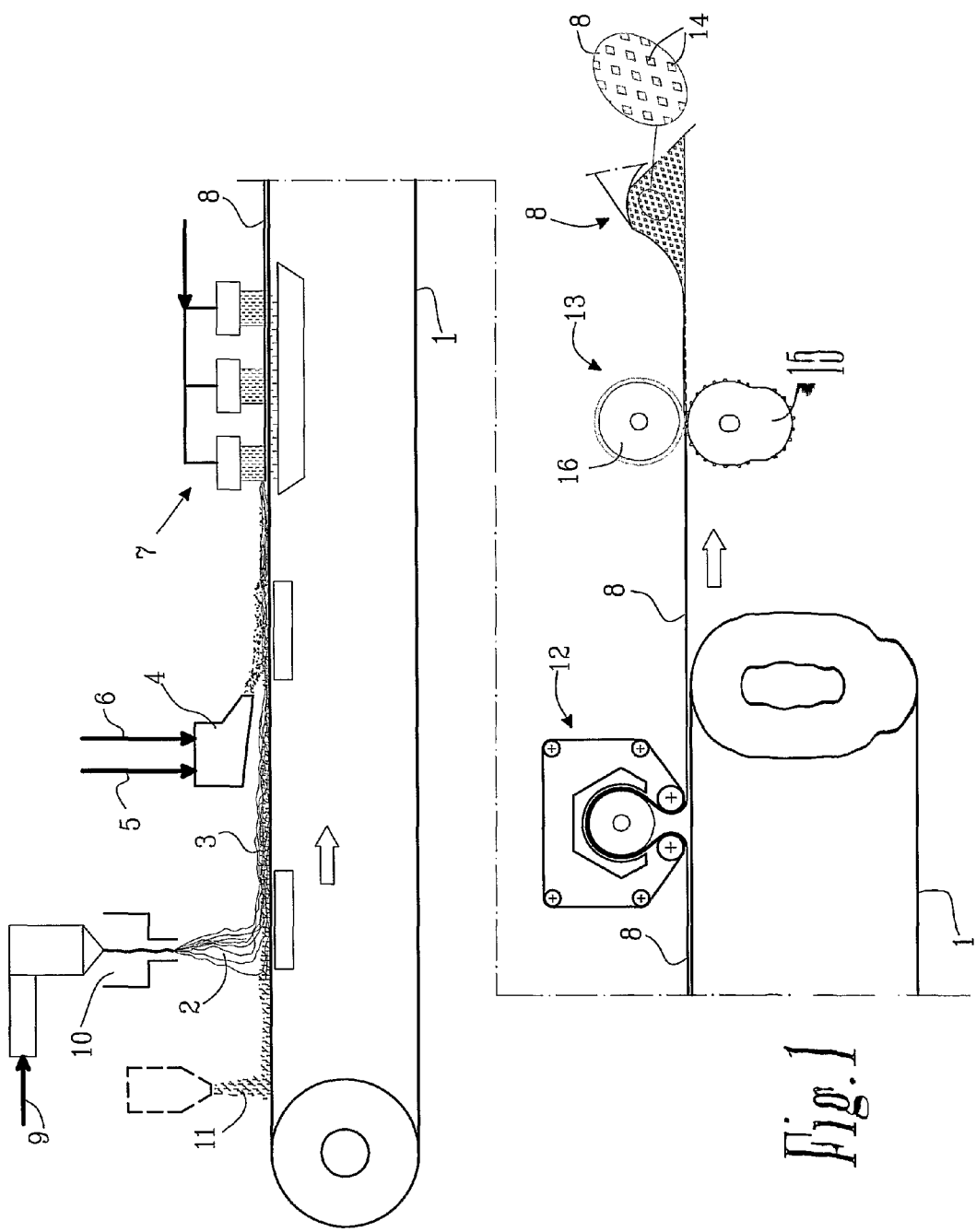
FIG. 1 shows schematically an exemplary embodiment of a device for producing a hydroentangled nonwoven material according to the invention.
Figure 2:
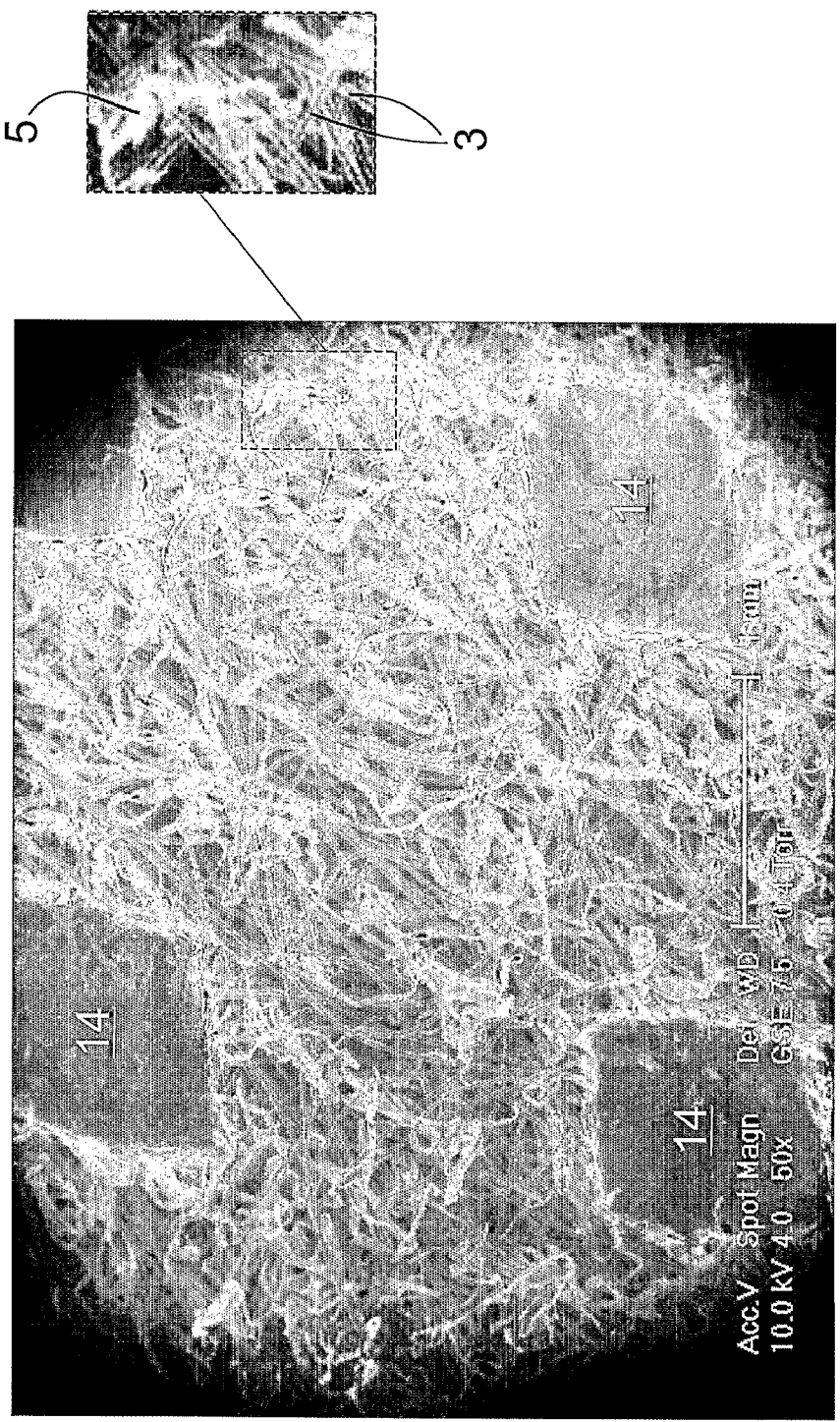
FIGS. 2 and 3 show ESEM pictures in different magnifications of a thermobonded hydroentangled nonwoven according to the invention.
Figure 3:
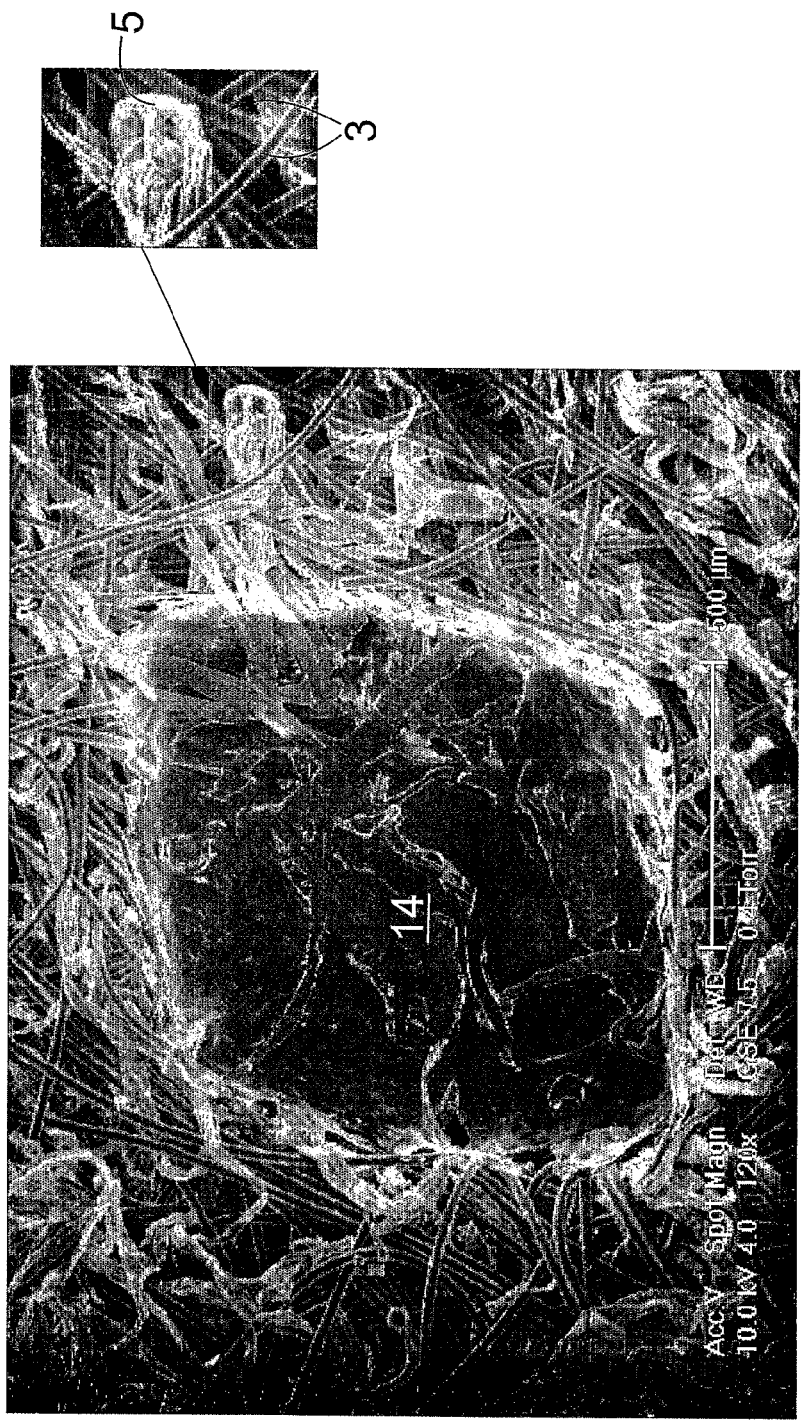

The improved hydroentangled well integrated composite nonwoven material comprises a mixture of continuous filaments, synthetic staple fibres, and natural fibres. These different types of fibres are defined as follows.

Filaments

Filaments are fibres that in proportion to their diameter are very long, in principle endless. They can be produced by melting and extruding a thermoplastic polymer through fine nozzles, whereafter the polymer will be cooled, preferably by the action of an air flow blown at and along the polymer streams, and solidified into strands that can be treated by drawing, stretching or crimping. Chemicals for additional functions can be added to the surface.

Filaments can also be produced by chemical reaction of a solution of fibre-forming reactants entering a reagent medium, e.g. by spinning of viscose fibres from a cellulose xanthate solution into sulphuric acid.

Meltblown filaments are produced by extruding molten thermoplastic polymer through fine nozzles in very fine streams and directing converging air flows towards the polymers streams so that they are drawn out into continuous filaments with a very small diameter. Production of meltblown is described in e.g. U.S. Pat. Nos. 3,849,241 and 4,048,364. The fibres can be microfibres or macrofibres depending on their dimensions. Microfibres have a diameter of up to 20 μm, usually 2-12 μm. Macrofibres have a diameter of over 20 μm, usually 20-100 μm.

Spunbond filaments are produced in a similar way, but the air flows are cooler and the stretching of the filaments is done by air to get an appropriate diameter. The fibre diameter is usually above 10 μm, usually 10-100 μm. Production of spunbond is e.g. described in U.S. Pat. No. 4,813,864 or 5,545,371.

Spunbond and meltblown filaments are as a group called spunlaid filaments, meaning that they are directly, in situ, laid down on a moving surface to form a web, which further on in the process is bonded. Controlling the 'melt flow index' by choice of polymers and temperature profile is an essential part of controlling the extruding and thereby the filament formation. The spunbond filaments normally are stronger and more even than meltblown filaments.

Tow is another source of filaments, which normally is a precursor in the production of staple fibres, but also is sold and used as a product of its own. In the same way as with spunlaid fibres, fine polymer streams are drawn out and stretched, but instead of being laid down on a moving surface to form a web, they are kept in a bundle to finalize drawing and stretching. When staple fibres are produced, this bundle of filaments is then treated with spin finish chemicals, normally crimped and then fed into a cutting stage where a wheel with knives will cut the filaments into distinct fibre lengths that are packed into bales to be shipped and used as staple fibres. When tow is produced, the filament bundles are packed, with or without spin finish chemicals, into bales or boxes.

Any thermoplastic polymer having sufficient coherent properties to let itself be drawn out in this way in the molten state, can in principle be used for producing meltblown or spunbond fibres. Examples of useful polymers are polyolefins, such as polyethylene and polypropylene, polyamides, polyesters and polylactides. Copolymers of these polymers may of course also be used, as well as natural polymers with thermoplastic properties. Bicomponent filaments may also be used. Bicomponent fibers and filaments refer to fibers and filaments having two polymeric compounds arranged in a core-sheath (concentric or eccentric), a side by side, a matrix or "island in sea" configuration, chosen to ensure that one component softens at a sufficiently lower temperature than the other component, in order to maintain a structural integrity of the fiber or filament.

Natural Fibres

There are many types of natural fibres that can be used, especially those that have a capacity to absorb water and tendency to help in creating a coherent sheet. Among the natural fibres possible to use there are primarily cellulosic fibres, such as seed hair fibres, e.g. cotton, kapok, and milkweed; leaf fibres e.g. sisal, abaca, pineapple, and New Zealand hamp; or bast fibres e.g. flax, hemp, jute, kenaf, and pulp. Wood pulp fibres are especially well suited to use, and both softwood fibres and hardwood fibres are suitable, as well as recycled fibres. The pulp fibre length will vary from around 3 mm for softwood fibres and around 1.2 mm for hardwood fibres and a mix of these lengths, and even shorter, for recycled fibres.

Staple Fibres

The staple fibres used can be produced from the same polymers as the filaments discussed above. Bicomponent staple fibers may also be used. Other usable staple fibres are those made from regenerated cellulose such as viscose and lyocell. They may be treated with spin finish and crimped, but this is not necessary for the type of processes preferably used to produce the material described in the present invention.

Spin finish and crimp is normally added to ease the handling of the fibres in a dry process, e.g. a carding equipment, and/or to give certain properties, e.g. hydrophilicity, to a material consisting only of these fibres, e.g. a nonwoven topsheet for a diaper.

The cutting of the fibre bundle normally is done to result in a single cut length, which can be altered by varying the distances between the knives of the cutting wheel. Depending on the planned use different fibre lengths are used, between 25-50 mm for a thermobonded nonwoven. Wetlaid hydroentangled nonwoven materials normally use fibre lengths between 12 and 18 mm, or down to 9 mm. Fibre lengths between 3 and 7 mm are disclosed in WO 2005/042819.

For hydroentangled materials made by traditional wetlaid technology, the strength of the material and its properties like surface abrasion resistance are increased as a function of the fibre length (for the same thickness and polymer of the fibre).

When continuous filaments are used together with staple fibres and pulp, the strength of the material will mostly come from the filaments.

Process

One general example of a method for producing the material according to the present invention is shown in FIG. 1. Continuous filaments 2 are laid down on an endless forming fabric 1 in a manner described in greater detail below. Excess air is sucked off through the forming fabric 1, to form the precursor of a web 3. The forming fabric 1 with the continuous filaments is advanced to a wetlaying station, where a slurry comprising a mixture of natural fibres 5 and staple fibres 6 is wetlaid via a headbox 4 on and partly into the precursor web of continuous filaments 2. Excess water is drained through the forming fabric.

In an alternative embodiment bicomponent staple fibers 11 having a length of 10 to 30 mm are laid as a thin layer on the forming fabric 1 prior to the continuous filaments. The bicomponent staple fibers are preferably drylaid on the forming fabric 1.

The forming fabric 1 with the filaments and fibre mixture is advanced to a hydroentangling station 7, where the filaments and fibres are mixed intimately together and bonded into a nonwoven web 8 by the action of a plurality of thin jets of high-pressure water impinging on the filaments and fibres to mix and entangle them with each other. Entangling water is drained through the forming fabric. The forming fabric 1 is advanced to a drying station 12, e.g. by blowing hot air onto and through the hydroentangled nonwoven web 8 to dry the web.

Subsequently the nonwoven web is thermobonded in a thermobonding station 13 in a bonding pattern, which will be described in greater detail below. The nonwoven web is then wound up and converted to a suitable format and packed.

Filament 'web'

According to the embodiment shown in FIG. 1 the continuous filaments 2 made from extruded molten thermoplastic pellets are laid down directly on the forming fabric 1 where they are allowed to form an unbonded web structure 3 in which the filaments can move relatively freely from each other. This is achieved preferably by making the distance between the nozzles and the forming fabric 1 relatively large, so that the filaments are allowed to cool down before they land on the forming fabric to reach a lower temperature at which their stickiness is largely reduced. Alternatively cooling of the filaments before they are laid down on the forming fabric is achieved in some other way, e.g. by means of using multiple air sources using air 10 is used to cool the filaments when they have been drawn out or stretched to the preferred degree. The air used for cooling, drawing and stretching the filaments is sucked through the forming fabric, to let the filaments follow the air flow into the meshes of the forming fabric to be stayed there. A good vacuum might be needed to suck off the air.

The speed of the filaments as they are laid down on the forming fabric is much higher than the speed of the forming fabric, so the filaments will form irregular loops and bends as they are collected on the forming fabric to form a very randomized precursor web.

The basis weight of the formed filament precursor web 3 should be between 2 and 50 g/m$^2$.

Wet-laying

The pulp 5 and staple fibres 6 are slurried in a conventional way, either mixed together or first separately slurried and then mixed, and conventional papermaking additives such as wet and/or dry strength agents, retention aids, dispersing agents, are added, to produce a well mixed slurry of pulp and staple fibres in water. In an alternative embodiment a surfactant is added to produce a foam of the slurry, so that the slurry will be foam formed, which is a variant of wet-laying.

This mixture is pumped out through a wet-laying headbox 4 onto the moving forming fabric 1 where it is laid down on the unbonded precursor filament web 3 with its freely moving filaments. The pulp and the staple fibres will stay on the forming fabric and the filaments. Some of the fibres will enter between the filaments, but the vast majority of them will stay on top of the filament web.

The excess water is sucked through the web of filaments laid on the forming fabric and down through the forming fabric, by means of suction boxes arranged under the forming fabric.

Hydroentangling

The fibrous web of continuous filaments and staple fibres and pulp is hydroentangled while it is still supported by the forming fabric 1 and is intensely mixed and bonded into a composite nonwoven material 8. An instructive description of the hydroentangling process is given in CA patent no. 841 938.

In the hydroentangling stage 7 the different fibre types will be entangled and a composite nonwoven material 8 is obtained in which all fibre types are substantially homogeneously mixed and integrated with each other. The fine mobile spunlaid filaments are twisted around and entangled with themselves and the other fibres which gives a material with a very high strength. The energy supply needed for the hydroentangling is relatively low, i.e. the material is easy to entangle. The energy supply at the hydroentangling is appropriately in the interval 50-500 kWh/ton.

No bonding, e.g. thermal bonding or hydroentangling, of the precursor filament web 3 should occur before the pulp 5 and staple fibres 6 are laid down 4. The filaments should be free to move in respect of each other to enable the staple and pulp fibres to mix and twirl into the filament web during entangling. Thermal bonding points between filaments in the filament web at this part of the process would act as blockings to stop the staple and pulp fibres to enmesh near these bonding points, as they would keep the filaments immobile in the vicinity of the thermal bonding points. The 'sieve effect' of the web would be enhanced and a more two-sided material would be the result. By no thermal bondings we mean that there are substantially no points where the filaments have been exerted to heat and pressure, e.g. between heated rollers, to render some of the filaments pressed together such that they will be softened and/or melted together to deform in points of contact. Some bond points could especially for meltblown result from residual tackiness at the moment of laying-down, but these will be without deformation in the points of contact, and would probably be so weak as to break up under the influence of the force from the hydroentangling water jets.

The strength of a hydroentangled material based on only staple and pulp will depend heavily on the amount of entangling points for each fibre; thus long staple fibres, and long pulp fibres, are preferred. When filaments are used, the strength will be based mostly on the filaments, and reached fairly quickly in the entangling. Thus most of the entangling energy will be spent on mixing filaments and fibres to reach a good integration. The unbonded open structure of the filaments according to the invention will greatly enhance the ease of this mixing.

The pulp fibres 5 are irregular, flat, twisted and curly and gets pliable when wet. These properties will let them fairly easily be mixed and entangled into and also stuck in a web of filaments, and/or longer staple fibres. Thus pulp can be used with a filament web that is prebonded, even a prebonded web that can be treated as a normal web by rolling and unrolling operations, even if it still does not have the final strength to its use as a wiping material.

The polymer fibres 6, though, are mostly round, even, of constant diameter and slippery, and are not effected by water. This makes them harder to entangle and force down into a prebonded filament web, they will tend to stay on top. Staple fibers of varying lengths may be used, from 3 mm up to about 18 mm. According to one embodiment of the invention short staple fibers, from 3 to 7 mm, more preferably from 4 to 6 mm, are used.

The entangling stage 7 can include several transverse bars with rows of nozzles from which very fine water jets under very high pressure are directed against the fibrous web to provide an entangling of the fibres. The water jet pressure can then be adapted to have a certain pressure profile with different pressures in the different rows of nozzles.

Alternatively, the fibrous web can before hydroentangling be transferred to a second entangling fabric. In this case the web can also prior to the transfer be hydroentangled by a first hydroentangling station with one or more bars with rows of nozzles.

Drying

The hydroentangled wet web 8 is then dried, which can be done on conventional web drying equipment, preferably of the types used for tissue, such as through-air drying 12 or heated can drying.

Thermobonding

If the short staple fibers 6 and natural fibers 5 are not sufficiently integrated with the continuous filaments 2 there will be a side with relatively high amount of filaments which are not anchored by the short fibers and the material will be sensitive to abrasion and pilling will occur when the material is used for wiping. Long segments of the filaments come loose and rise above the surface of the material. Even if the continuous filaments are well integrated with the short fibers pilling may be a problem, especially since short fibers of up to 7 mm in length have a very limited ability to twist around and entangle with the filaments as compared to longer staple fibers.

In order to reduce the problem of pilling the hydroentangled and dried web 8 is according to the invention thermobonded 13 in a non-random bonding pattern comprising a plurality of bonding sites 14, in which the thermoplastic material of the continuous filaments 2 and/or the synthetic staple fibers 6 has been caused to at least partly soften or melt to create thermal bonds between the continuous filaments. The thermobonding may either take place in-line with the hydroentangling and drying process before winding the web material 8 into mother rolls, or in a subsequent process for example in connection with converting the material into suitable formats.

Thermobonding may take place by any suitable process such as heat bonding, ultrasonic bonding or laser bonding. Heat bonding may be in the form of hot calendering. The bonding pattern should comprise a plurality of discrete relatively small bonding sites adapted to create bonds between the filaments preventing or at least considerably reducing the risk for segments of filaments to come loose and rise from the surface of the material to cause pilling. The bonding sites 14 could have any geometrical shape and suitably each have a bonding area of 0.1 to 3 mm$^2$, preferably from 0.15 to 2 mm$^2$.

The bonding density, i.e. the number of bonding sites 14 per surface area, is a further important aspect, and suitably the bonding density is between 1 and 100 bonding sites per cm$^2$, preferably between 2 and 90 bonding sites per cm$^2$ and more preferably between 5 and 80 bonding sites per cm$^2$. The bonding sites are preferably uniformly distributed over the web material 8, but may also be arranged in groups. In the latter case the number of bonding sites is taken as an average value over a surface area that is large enough to be representative for the bonding pattern in question.

The total bonding area, which is defined as the surface area of the thermally bonded web material 8 that is occupied by bonding sites in relation to the entire area circumscribed by the bonding pattern including the non-bonded areas between bonding sites, is suitably between 1 and 25%, preferably between 2 and 20% and more preferably between 5 and 18%.

The thermobonding needs only be sufficient for softening or melting the surface layer of the filament side of the nonwoven material 8, which is the fabric side of the web onto which the continuous filaments 2 have been laid and which usually has a higher amount of filaments than the other side, even in cases where a good integration between short fibers and filaments has been achieved. This may be accomplished for example by applying only a very slight pressure by a non-patterned heated roll 15 against the side of the nonwoven material 8 to be thermobonded and having a non-heated counter roll 16. Normally both the pattern roll 15 and the counter roll 16 are however heated, while the pattern roll has the highest temperature, so that there is a temperature difference between the two rolls.

In one embodiment described above bicomponent staple fibers are laid on the forming fabric as a first layer, while the filaments 2 are laid on top of the bicomponent fiber layer 11. The mixture of natural fibers 5 and short staple fibers 6 are then wetlaid on top of the filaments in the same manner as the other embodiments. During hydroentangling the bicomponent fibers 11 will migrate with the filaments, but will mainly remain close to the fabric-side of the web. Thermobonding from the fabric side of the web will cause the low temperature softening component of the bicomponent fibers 11 to soften and to create thermobonds between the filaments, while the rest of the web is not or at least less effected by the thermobonding. Thus the thermal bonds are only created where most needed.

If the nonwoven material 8 is thermobonded to a very high degree this will negatively influence other properties such as absorption and stiffness for example.

Further Process Steps and Treatments

The nonwoven material is then converted in known ways to suitable formats and packed. The structure of the nonwoven material can be changed by further processing such as micro-creping, embossing, etc. To the nonwoven material can also be added different additives such as wet strength agents, binder chemicals, latexes, debonders, etc.

Nonwoven Material

Nonwoven materials according to the invention can be produced with a wide range of basis weights, preferably with a basis weight of 20-120 g/m$^2$, more preferably 50-80 g/m$^2$.

The nonwoven materials may comprise only continuous filaments and natural fibers, but may in addition also contain staple fibres. The staple fibers may be based on different polymers, with different lengths and dtex. According to one embodiment the staple fibers are relatively short, between 3 and 7 mm, since these are more easily mixed and integrated with the natural fibers and the filament. It is also contemplated to add a certain proportion of synthetic staple fibres longer than 7 mm and even longer than 12 mm to the composite nonwoven. This certain proportion could be up to 10% of the total amount of synthetic staple fibres, based on weight portions.

The invention is of course not limited to the embodiments shown in the drawings and described above and in the examples but can be further modified within the scope of the claims.

EXAMPLES

A number of hydroentangled materials according to the invention with different bonding patterns were produced and tested with respect to interesting parameters in comparison with reference materials which were not thermobonded.

Specific Tests Used:

Taber wet—A wet (soaked in water and drip dried for 1 minute) material to be tested is fastened on a plate and abrasive wheels are made to run in a circle upon it, according to ASTM D 3884-92, with some modifications caused by measuring a thin, non-permanent material, and not floor carpets as the method was originally designed for. The modifications consist of using wheels Calibrase CS-10, but with no extra weights added, and only 100 and 150 revolutions are made. The resulting abrasion wear is compared to an internal standard, where 1 means 'abraded to shreds' and 5 means 'hardly visibly affected'. The apparatus used was of the type '5151 Abraser' from Taber Industries, N. Tonawanda, N.Y., USA.

The materials were tested in a wet condition in order to simulate the intended use, and since wet materials are more sensitive to pilling and therefore give a clearer result. The test was made on nonwoven samples according to the invention and on reference samples, where the two sides of the samples are designated fabric side, meaning the side of the nonwoven which has been against the forming fabric when the filaments, staple fibres and pulp have been laid down, and the free side, meaning the side of the nonwoven from which the different fibres have been laid down.

Example 1

A 0.4 m wide web of spunlaid filaments was laid down onto a forming fabric at 20 m/min such that the filaments were not bonded to each other. By a 0.4 m wide headbox a fibre dispersion containing pulp fibres and shortcut staple fibres was laid onto the unbonded web of spunlaid filaments and the excess water was drained and sucked off.

The unbonded spunlaid filaments and wetlaid fibres were then mixed and bonded together by hydroentanglement. The hydroentanglement was done from the free side and the pulp and staple fibres were thus moved into and mixed intensively with the spunlaid filament web. The hydroentangled material was dewatered and then dried using a through-air drum drier. Finally the material was thermobonded from the fabric side using a hot calendaring technique (Hot S-Roll Technology by Andritz Küsters GmbH & Co. KG, Germany) and using different bonding patterns with different bonding densities and bonding areas.

The total basis weight of the tested filament-staple-pulp composites was around 80 and 65 gsm respectively. The composition of the 80 gsm composite material was: 25% spunlaid polypropylene filaments having a fineness of 2.4 dtex, 10% shortcut polypropylene staple fibres having a length of 6 mm and a fineness of 1.7 dtex and 65% chemical pulp. The amounts are given as wt % based on the dry weight of the fibres. The composition of the 65 gsm composite materials was: 25% spunlaid polypropylene filaments having a fineness of 4 dtex, 10% shortcut polypropylene staple fibres having a length of 6 mm and a fineness of 1.7 dtex and 65% chemical pulp. A wet strength agent in the form PAE was added. The amount in both cases was 0.2 wt % active substance PAE calculated on the dry weight of the composite material. The 80 gsm material was hydroentangled with a total entanglement energy of 200 kWh/ton and the 65 gsm material was hydroentangled with a total entanglement energy of 250 kWh/ton.

The surface abrasion wear resistance strength measured by the Taber abrasion wear test on the fabric side of the material, see Table 1. As can be seen the abrasion resistance was considerably improved by the thermobonding.

TABLE 1

| Pattern | Bonded area (%) | Bonding density (no./cm2) | Area of bonding sites (mm²) | Line pressure (N/mm) | Temp. embossing roll (° C.) | Temp. backing roll (° C.) | Line speed (m/min) | Abrasion resistance 100 cycles (Scale) | Abrasion resistance 150 cycles (Scale) |
|---|---|---|---|---|---|---|---|---|---|
| 1* | — | — | — | — | — | — | — | 1 | 1 |
| 2 | 13 | 76 | 0.176 | 30 | 155 | 120 | 25 | 5 | 4 |
| 3 | 13 | 76 | 0.176 | 50 | 155 | 120 | 25 | 4 | 4 |
| 4 | 10 | 14.8 | 0.64 | 30 | 155 | 120 | 25 | 4 | 4 |
| 5** | — | — | — | — | — | — | — | 1 | 1 |
| 6 | 17 | 11 | 1.44 | 40 | 155 | 120 | 25 | 3 | 3 |
| 7 | 6.5 | 9 | 0.72 | 40 | 155 | 120 | 25 | 3 | 3 |

*= Ref. 80 gsm (without thermobonding)
**= Ref. 65 gsm (without thermobonding)

The invention claimed is:

1. A hydroentangled composite nonwoven material, comprising:
a web of randomized un-thermally bonded spunlaid filaments, on which a mixture of synthetic staple fibres and wood pulp fibres has been wetlaid, wherein
one side of the nonwoven material contains a relatively higher amount of the spunlaid filaments than an opposite side of the nonwoven material,
the nonwoven material is bonded in a non-random bonding pattern comprising a plurality of bonding sites each having a bonding area of 0.1 to 3 mm², in which thermoplastic material comprised in the nonwoven material has been caused to at least partly soften or melt to create thermal bonds between the un-thermally bonded spunlaid filaments, and
the thermal bonds do not penetrate the entire thickness of the material and are applied on the side containing the relatively higher amount of spunlaid filaments, and wherein
the nonwoven material comprises no other thermal bonds between the filaments than provided by said non-random bonding pattern.

2. The hydroentangled nonwoven material according to claim 1, wherein the bonding sites cover an area in a range of 1 to 25% of the total area of the thermally bonded nonwoven material.

3. The hydroentangled nonwoven material according to claim 1, wherein the bonding pattern has a bonding density in a range of from 1 to 100 bonding sites per cm².

4. The hydroentangled nonwoven material according to claim 1, wherein the synthetic staple fibers have a length of 3 to 7 mm.

5. The hydroentangled nonwoven material according to claim 1, wherein no more than 10% of the synthetic staple fibers contained in the nonwoven material has a length greater than 7 mm.

6. The hydroentangled nonwoven material according to claim 1, wherein the mixture is made up of 10-50% spunlaid filaments, 20-85% wood pulp fibres, and 5-50% synthetic staple fibres, all percentages calculated by weight of the total nonwoven material.

7. The hydroentangled nonwoven material according to claim 1, wherein at least part of the synthetic staple fibers are bicomponent fibers having a low melting component and a high melting component, and the thermobonding is accomplished by melting of the low melting component of the bicomponent fibres to create the bonding sites between the spunlaid filaments.

8. The hydroentangled nonwoven material according to claim 7, wherein the bicomponent staple fibers are predominantly located on the one side of the nonwoven material, said one side also containing a relatively higher amount of spunlaid filaments than the opposite side of the nonwoven material.

9. The hydroentangled nonwoven material according to claim 1, wherein the bonding sites cover an area of 2 to 20% of a total area of the thermally bonded nonwoven material, and the bonding pattern has a bonding density of from 2 to 90 bonding sites per cm².

10. The hydroentangled nonwoven material according to claim 1, wherein the bonding sites cover an area of 18% of a total area of the thermally bonded nonwoven material, and the bonding pattern has a bonding density of from 5 to 80 bonding sites per cm².

11. The hydroentangled nonwoven material according to claim 4, wherein the hydroentangled nonwoven material is free from staple fibers having a length greater than 7 mm.

12. A hydroentangled composite nonwoven material, comprising:
a web of randomized un-thermally bonded spunlaid filaments, on which natural fibres have been wetlaid, wherein
one side of the nonwoven material contains a relatively higher amount of the spunlaid filaments than an opposite side of the nonwoven material,
the nonwoven material is bonded in a non-random bonding pattern comprising a plurality of bonding sites each having a bonding area of 0.1 to 3 mm², in which thermoplastic material comprised in the nonwoven material has been caused to at least partly soften or melt to create thermal bonds between the un-thermally bonded spunlaid filaments, and
the thermal bonds do not penetrate the entire thickness of the material and are applied on the side containing the relatively higher amount of spunlaid filaments, and wherein
the nonwoven material comprises no other thermal bonds between the filaments than provided by said non-random bonding pattern.

* * * * *